United States Patent [19]
Nishigaki et al.

[11] Patent Number: 5,900,912
[45] Date of Patent: * May 4, 1999

[54] BROADCASTING SIGNAL RECEIVER

[75] Inventors: Tetsuo Nishigaki, Kanagawa; Kae Nagano, Tokyo, both of Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/560,662

[22] Filed: Nov. 20, 1995

[30] Foreign Application Priority Data

Nov. 28, 1994 [JP] Japan ..................................... 6-292895

[51] Int. Cl.$^6$ .............................. H04N 7/00; H04N 11/00
[52] U.S. Cl. .......................... 348/460; 348/906; 348/473; 348/474; 348/552
[58] Field of Search ..................................... 348/460, 906, 348/473, 474, 552, 553; H04N 7/00, 11/00

[56] References Cited

U.S. PATENT DOCUMENTS

| | | | |
|---|---|---|---|
| 4,547,804 | 10/1985 | Greenberg | 358/142 |
| 4,908,707 | 3/1990 | Kinghorn | 358/147 |
| 4,977,455 | 12/1990 | Young | 358/142 |
| 5,432,558 | 7/1995 | Kim | 348/460 |
| 5,526,127 | 6/1996 | Yonetani | 358/335 |
| 5,552,833 | 9/1996 | Henmi et al. | 348/460 |
| 5,557,422 | 9/1996 | Nishigaki et al. | |

FOREIGN PATENT DOCUMENTS

| | | |
|---|---|---|
| 0 492 298 | 7/1992 | European Pat. Off. . |
| 0 577 283 | 1/1994 | European Pat. Off. . |
| 0 589 369 | 3/1994 | European Pat. Off. . |
| 0 635 980 | 1/1995 | European Pat. Off. . |

*Primary Examiner*—John K. Peng
*Assistant Examiner*—Virek Srivastava
*Attorney, Agent, or Firm*—Frommer Lawrence & Haug, LLP; William S. Frommer

[57] ABSTRACT

The invention provides a broadcasting signal receiver which can prevent a failure in reserved recording. A microcomputer decodes a VCR+code of a program desired to be recorded by reservation, which is inputted by way of a remote commander or the like, to obtain data of program starting and ending times and channel information. A channel indicated by the channel information is selected by a tuner circuit, and program table data is extracted from a character broadcasting signal multiplexed in a video signal by a decoder. It is discriminated whether or not one of the program starting times of programs included in the program table data coincides with the program starting time obtained by decoding of the VCR+code. A result of the discrimination is displayed on a monitor television. Only when it is discriminated that a coincident program starting time is present, the data of the program starting and ending times and the channel information are written into a reservation memory and registered for reservation. Recording is started when the program label (program starting time) extracted from the video signal by the decoder coincides with the program starting time of the reservation memory.

8 Claims, 3 Drawing Sheets

FIG. 3

```
P199 199 ARD/ZDF Di 14.01.86 10:20:05

ZDF                              MONTAG.
                              25.Febr.1985

IHR PROGRAM    ■■■■■■■■■■■■■

19.00      heute
19.10      Das Narrenschiff'85
           aus Rolandseck
19.30      Ein klarer Fall
21.10      heute-journal
           10 Minuten Laenger
21.35      Rene Kollo:
           Ich lade gern mir
           Gaeste ein (VPS 21.25)
23.15      Die Voegel (VPS 23.05)
           Ein phantastischer Film
01.10      heute (VPS 01.00)
01.20      Sendeschluss
```

STARTING TIME
AFTER CHANGE

STARTING TIME
BEFORE CHANGE
(PROGRAM LABEL)

BROADCASTING SIGNAL RECEIVER

BACKGROUND OF THE INVENTION

1. Field of the Invention

This invention relates to a broadcasting signal receiver which can be suitably applied to a video tape recorder which can reserve recording using, for example, a VCR+code (Video+code).

2. Description of the Related Art

A video tape recorder has been proposed which performs reserved recording using a starting time of a program, obtained by decoding of a VCR+code, as a program label. In a video tape recorder of the type mentioned, a VCR+code inputted is decoded to obtain a program starting time (starting date, hour and minute), a program ending time and channel information. The data obtained are written into a reservation memory.

Then, when a single program is written in the reservation memory, a channel of the program is selected and a program label (program starting time) is extracted from a character broadcasting signal or the like multiplexed in a broadcasting signal. Then, it is discriminated whether or not the program label thus extracted coincides with the program label (program starting time) written in the reservation memory. When coincidence is discriminated, recording is started.

On the other hand, when a plurality of programs are written in the reservation memory, channels of the programs are successively selected at intervals of several seconds. Then, a program label (program starting time) is extracted from a character broadcasting signal or the like multiplexed in a broadcasting signal of each selected channel, and it is discriminated whether or not the program label coincides with the corresponding program label (program starting time) written in the reservation memory. When coincidence is discriminated, recording is started with the selected channel.

In a video tape recorder which performs reserved recording using a starting time of a program obtained by decoding of a VCR+code as a program label as described above, for example, when the starting time of a program is changed, although the program label inserted in a broadcasting signal is not changed, the starting time obtained by decoding of the VCR+code is changed so that it may be a starting time after changed. Consequently, the program label inserted in the broadcasting signal does not coincide any more with the program label (program starting time) written in the reservation memory based on a VCR+code inputted after the change of the broadcasting time, resulting in failure in starting of recording. This is a problem of the video tape recorder.

SUMMARY OF THE INVENTION

It is an object of the present invention to provide a broadcasting signal receiver which can prevent a failure in reserved recording of a broadcasting signal.

In order to attain the object described above, according to the present invention, there is provided a broadcasting signal receiver, comprising data extraction means for extracting program table data inserted in a broadcasting signal and including at least program labels, data inputting means for directly or indirectly inputting a program label, coincidence discrimination means for discriminating whether or not the program labels included in the program table data include a program label which coincides with the program label inputted by the data inputting means, and outputting means for outputting a result of the discrimination of the coincidence discrimination means.

In the broadcasting signal receiver, it is discriminated whether or not program labels included in program table data inserted in a broadcasting signal include a program label which coincides with a program label inputted from the data inputting means. A result of the discrimination is outputted and, for example, displayed. Consequently, reservation of recording of a broadcasting signal based on a wrong input of a program label which is not included in the program labels included in the program table data can be prevented, and a failure in reserved recording can be prevented.

The data inputting means may input a VCR+code, decode the VCR+code to obtain a program starting time, and use the program starting time as the program label inputted by the data inputting means. In the broadcasting signal receiver, the program starting time obtained by decoding of the inputted VCR+code is used as the program label. Consequently, reservation of recording of a broadcasting signal based on a wrong input of a program starting time (VCR+code) which is not included in the program starting times included in the program table data can be prevented, and a failure in reserved recording can be prevented.

Or, the broadcasting signal receiver may be constructed such that, when the coincidence discrimination means discriminates that no coincident program label is present, the outputting means outputs a program label, from among the program labels included in the program table data, which is similar to the program label inputted by the data inputting means and information related to the program label. In the broadcasting signal receiver, when it is discriminated that the program labels included in the program table data do not include a program label which coincides with the inputted program label, a program label from among the program labels included in the program table data which is similar to the inputted program label and information related to the program label are outputted and, for example, displayed. Consequently, for example, when the broadcasting time of a certain program is changed, reservation registration of the program can be performed readily by referring to the program label (program starting time) which is similar to the inputted program label and information related to the program label.

Else, the broadcasting signal receiver may be constructed such that the program labels are program starting times, and when the coincidence discrimination means discriminates that no coincident program label is present, the coincidence discrimination means discriminates coincidence between program starting times after changed related to the program labels included in the program table data and the program label inputted by the inputting means and a result of the discrimination is outputted from the outputting means. In the broadcasting signal receiver, when it is discriminated that the program starting times included in the program table data do not include a program starting time which coincides with the inputted program starting time, it is discriminated whether or not a program starting time after changed related to a program starting time included in the program table data coincides with the inputted program starting time. Then, a result of the discrimination is outputted and, for example, displayed. Consequently, when, for example, a broadcasting time is changed, a result of discrimination that a coincident program starting time is present is outputted. Accordingly, it is possible to cause a user to recognize the change of the broadcasting time.

Or else, the broadcasting signal receiver may be constructed such that it further comprises recording means for recording the broadcasting signal, that the program labels are program starting times, and that, when the coincidence discrimination means discriminates that no coincident program label is present, a recording operation by the recording means is started at the time indicated by the inputted program label. In the broadcasting signal receiver, when it is discriminated that the program starting times included in the program table data do not include a program starting time which coincides with the inputted program starting time, a recording operation by the recording means is started at the inputted program starting time. Consequently, even if reservation registration is performed with the inputted program starting time, the situation that recording of a broadcasting signal is not performed at all can be prevented since the recording operation is not started in response to discrimination of coincidence between a program starting time as a program label inserted in the broadcasting signal and the program starting time registered for reservation.

Having now fully described the invention, it will be apparent to one of ordinary skill in the art that many changes and modifications can be made thereto without departing from the spirit and scope of the invention as set forth herein.

BRIEF DESCRIPTION OF THE DRAWINGS

FIG. 3 is a diagrammatic view showing an example of a program table of the VPT format of character broadcasting employed in Germany.

DESCRIPTION OF THE PREFERRED EMBODIMENT

Figure 1:
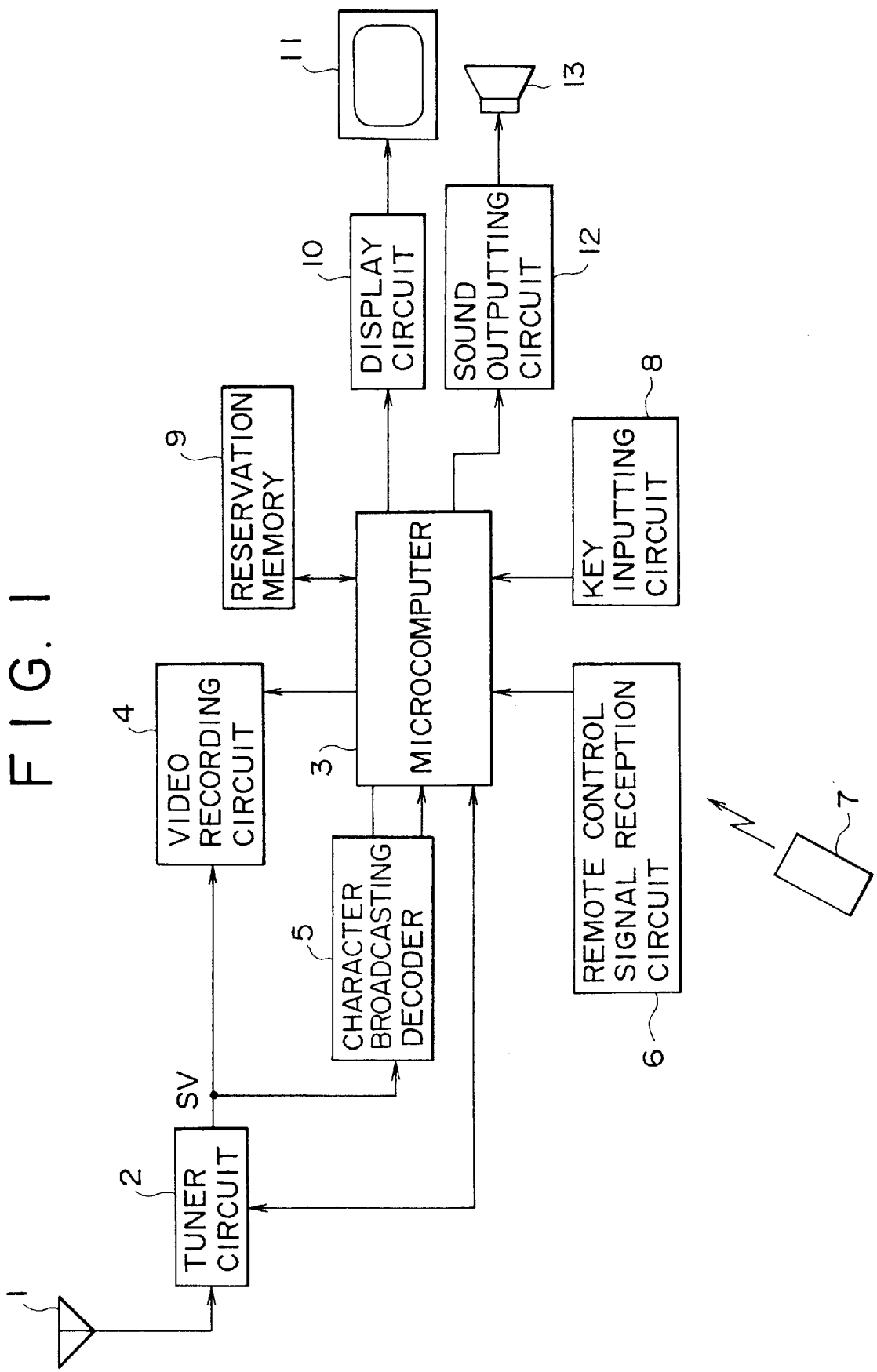
FIG. 1 is a block diagram of a broadcasting signal receiver showing a preferred embodiment of the present invention.

Referring first to FIG. 1, there is shown in block diagram a broadcasting signal receiver to which the present invention is applied. In the embodiment shown, the broadcasting signal receiver is constructed as a a video tape recorder and makes use of a character broadcasting signal (teletext signal) multiplexed in a television broadcasting signal.

Figure 2:
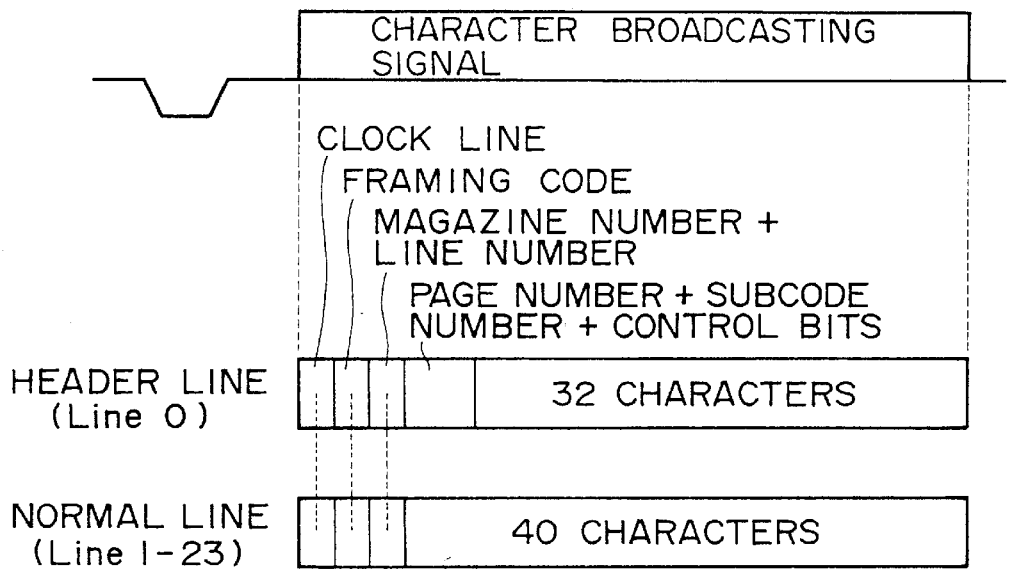
FIG. 2 is a diagrammatic view illustrating a format of a character broadcasting signal (teletext signal) employed in Europe.
Figure 2:
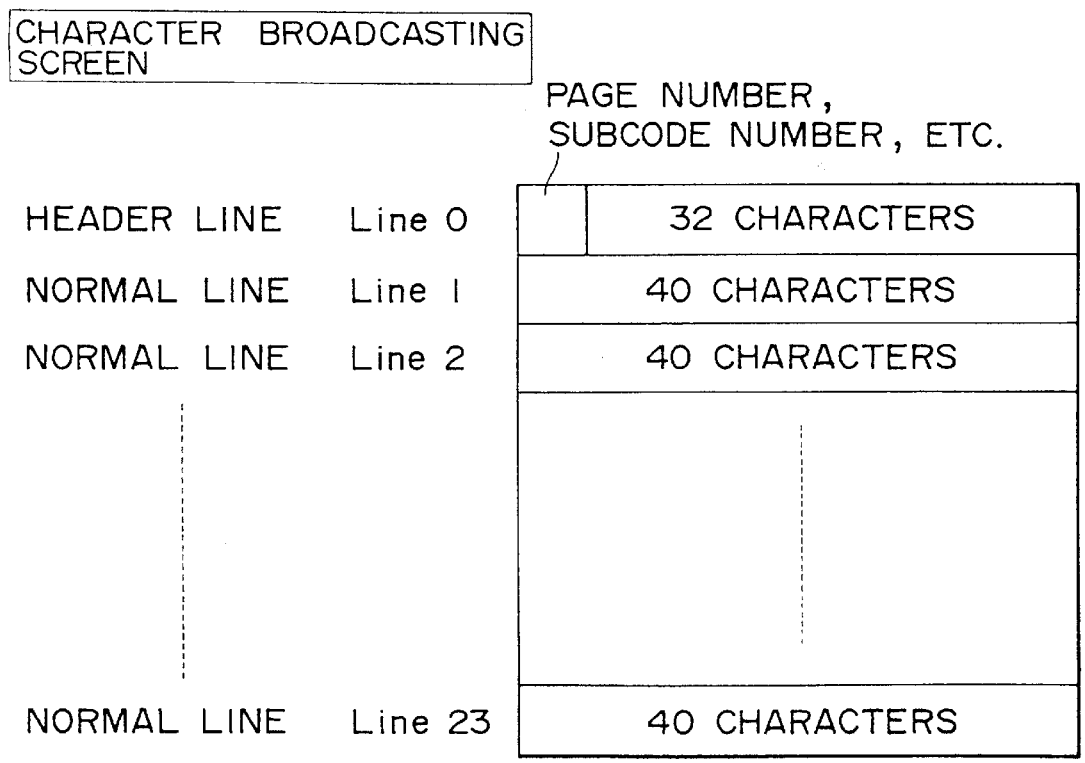

FIG. 2 illustrates the format of a known character broadcasting signal (teletext signal) which is conventionally employed in Europe. Referring to FIG. 2, the character broadcasting signal includes a header line and normal lines. A page number and a subcode number are included in the header line. Further, program table data are included in the character broadcasting signal, and a program table of television broadcasting can be displayed with the program table data. An example of the program table is illustrated in FIG. 3. Referring to FIG. 3, in the program table shown, names of broadcasting stations, starting times (starting dates, hours and minutes) of individual programs, program titles and so forth are displayed. When a broadcasting time is changed, also a starting time before changed is displayed. Further, when each program of television broadcasting is broadcasted, data of a starting time as a program label is included in the character broadcasting signal.

Referring back to FIG. 1, a television broadcasting signal caught by an antenna 1 is supplied to a tuner circuit 2 which includes an intermediate frequency amplification circuit, a video detection circuit and so forth not shown. A tuner control signal such as a selection broadcasting station voltage is supplied to the tuner circuit 2 by a microcomputer 3 which forms a system controller to select a broadcasting station. Meanwhile, a data signal such as an AFT signal is supplied from the tuner circuit 2 to the microcomputer 3.

A video signal SV is outputted from the tuner circuit 2 and supplied to a video recording circuit 4 and also to a character broadcasting decoder 5. Operation of the video recording circuit 4 is controlled by the microcomputer 3. Also operation of the decoder 5 is controlled by the microcomputer 3 so that program table data and data of program starting times as program labels are extracted from the character broadcasting signal multiplexed in the video signal SV as hereinafter described. The program table data and the data of the program starting times as program labels extracted from the character broadcasting signal by the decoder 5 are supplied to the microcomputer 3.

A remote control signal reception circuit 6 is connected to the microcomputer 3 so that a remote control signal from a remote commander 7 is supplied to the microcomputer 3 by way of the reception circuit 6. Also a key inputting circuit 8 is connected to the microcomputer 3. Further, a reservation memory 9 is connected to the microcomputer 3. Data of a starting time and an ending time of each program and channel information reserved by manual operations of keys of the remote commander 7 and/or the key inputting circuit 8 are written into the reservation memory 9.

Further, a display circuit 10 is controlled by the microcomputer 3 to control a screen display of a monitor television 11. Furthermore, an audio outputting circuit 12 is controlled by the microcomputer 3 to control an audio output from a loudspeaker 13.

In the video tape recorder of the construction described above, if a VCR+code corresponding to a program desired to be recorded by reservation is inputted to the microcomputer 3 by manual operations of the keys of the remote commander 7 and/or the key inputting circuit 8, then the VCR+code is decoded by the microcomputer 3. Data of a starting time (starting date, hour and minute), an ending time and channel information of the program are obtained by the decoding. In this instance, when the broadcasting time has been changed, depending upon the VCR+code inputted, the starting time of the program may be a starting time before changed or after changed.

Then, by control of the microcomputer 3, a channel indicated by the channel information mentioned above is selected by the tuner circuit 2, and program table data are extracted by the decoder 5 from a character broadcasting signal multiplexed in a broadcasting signal of the channel. Thereafter, it is discriminated by the microcomputer 3 whether or not the program labels of the programs included in the program table data, that is, in the present embodiment, the program starting times (when any of the broadcasting times has been changed, the program starting time before changed is used), include a program starting time which coincides with the inputted program label, that is, in the present embodiment, the program starting time obtained by decoding of the VCR+code.

After the discrimination is completed, data representing a result of the discrimination is supplied from the microcomputer 3 to the display circuit 10 so that the discrimination result is displayed on the monitor television 11. Further, when it is discriminated that a coincident program starting time is present, the data of the starting time and the ending time of the program and the channel information obtained by decoding of the VCR+code described above are written into the reservation memory 9 by the microcomputer 3 to perform reservation registration.

Thereafter, if a VCR+code of a program desired to be recorded by reservation is inputted by manual operations of the keys of the remote commander 7 and/or the key inputting circuit 8, then the video tape recorder operates in a similar manner. In particular, it is first discriminated whether or not the program starting times of the programs included in the program table data include a program starting time which coincides with a program starting time obtained by decoding of the VCR+code. Then, a result of the discrimination is displayed on the monitor television 11. Further, when it is discriminated that a coincident program starting time is present, data of the starting time and the ending time of the program and the channel information obtained by decoding of the VCR+code are written into the reservation memory 9 to perform reservation registration.

Subsequently, a starting operation of reserved recording will be described. When only one program is written in the reservation memory 9, under the control of the microcomputer 3, a channel of the program is selected by the tuner circuit 2 while data of a program label (program starting time) is extracted, from a character broadcasting signal multiplexed in a broadcasting signal of the selected channel, by the decoder 5. Then, it is discriminated by the microcomputer 3 whether or not the program label (program starting time) extracted by the decoder 5 and the program starting time written in the reservation memory 9 coincide with each other. When coincidence is discriminated, the video recording circuit 4 is controlled by the microcomputer 3 to start recording.

On the other hand, when a plurality of programs are written in the reservation memory 9, under the control of the microcomputer 3, channels of the programs are successively selected for several seconds at intervals of, for example, 3 to 4 seconds. Then, data of program labels (program starting times) are extracted from a character broadcasting signal multiplexed in a broadcasting signal of each selected channel by the decoder 5. Thereafter, it is discriminated by the microcomputer 3 whether or not the program label (program starting time) extracted by the decoder 5 coincides with the data of the program starting time written in the reservation memory 9. When coincidence is discriminated, the video recording circuit 4 is controlled to start recording with the channel selected then.

In summary, in the present embodiment, when a VCR+ code of a program desired to be recorded by reservation is inputted by manual operations of the keys of the remote commander 7 and/or the key inputting circuit 8, it is discriminated whether or not program starting times of programs included in program table data include a program starting time which coincides with a program starting time obtained by decoding of the VCR+code. Then, a result of the discrimination is displayed on the monitor television 11. When it is discriminated that a coincident program starting time is present, data of the starting time and the ending time of the program and the channel information obtained by decoding of the VCR+code are written into the reservation memory 9 to perform reservation registration.

Consequently, when it is displayed on the monitor television 11 that no coincident program starting time is present, reservation registration of the program based on the VCR+ code inputted is not performed. In other words, when the program starting times of the programs included in the program table data do not include a program starting time which coincides with the program starting time obtained by decoding of the VCR+code, no reservation registration is performed. Consequently, a failure in reserved recording can be prevented.

It is to be noted that, while, in the embodiment described above, reservation registration is performed automatically when program starting times of programs included in program table data include a program starting time which coincides with a program starting time obtained by decoding of a VCR+code, reservation registration may alternatively be performed only after a user performs a confirmation operation for reservation registration based on a result of discrimination displayed on the monitor television 11. In this instance, when the result of discrimination that no coincident program starting time is present is displayed on the monitor television 11, a failure in reserved recording can be prevented by avoiding a confirmation operation for reservation registration.

Further, while, in the embodiment described above, a result of discrimination of whether or not program starting times of programs included in program table data include a program starting time which coincides with a program starting time obtained by decoding a VCR+code is displayed on the monitor television 11, alternatively an audio signal corresponding to the result of the discrimination may be supplied from the audio outputting circuit 12 to the loudspeaker 13 so that the result of the discrimination may be outputted in the form of sound from the loudspeaker 13.

Further, though not described above, when it is discriminated that program starting times of programs included in program table data do not include a program starting time which coincides with a program starting time obtained by decoding of a VCR+code, if the program starting times of the programs included in the program table data include a program starting time which is similar to the program starting time obtained by decoding of the VCR+code, then the similar program starting time may be displayed on the monitor television 11 so that, when the similar program starting time is selected by the user, reservation registration may be performed with the similar program starting time.

In this instance, the similar program starting time, a program ending time obtained by correcting the program ending time obtained by decoding of the VCR+code with a difference between the program starting time obtained by the decoding of the VCR+code and the similar program starting time described above and the data of the channel information obtained by decoding of the VCR+code are written into the reservation memory 9 and registered for reservation. It is to be noted that reservation registration may alternatively be performed with the similar program starting time irrespective of whether or not the similar program starting time has been selected by the user.

Further, though not described above, when a result of discrimination that a coincident program starting time is present is displayed on the monitor television 11, the coincident program starting time may be displayed. Then, in addition to the coincident or similar program starting time displayed on the monitor television 11, related information such as a title of the program or a type of the program (news, sports, drama, cinema or the like) may be displayed simultaneously. Furthermore, for a program whose broadcasting time has been changed, the program starting time after changed may be displayed as related information to the similar program starting time.

When it is discriminated that program starting times of programs included in program table data do not include a program starting time which coincides with a program starting time obtained by decoding of a VCR+code, where that one of the program starting times of the programs included in the program stable data which is similar to the program starting time obtained by decoding of the VCR+ code is displayed together with information related to it (including the program starting time after changed) on the monitor television 11, if, for example, the broadcasting time of a certain program is changed, then reservation registration of the program can be performed accurately referring to the display.

Further, although, in the embodiment described above, reservation registration is not performed when program starting times of programs included in program table data do not include a program starting time which coincides with a program starting time obtained by decoding of a VCR+code, reservation registration may be performed also when no coincident program starting time is present in this manner. In the reservation registration in this instance, a mode in which recording is started when a program label (program starting time) extracted from a character broadcasting signal multiplexed in a broadcasting signal coincides with a program starting time written in the reservation memory 9 should be canceled, but another mode wherein recording is started at the program starting time written in the reservation memory 9 should be established instead. This can prevent a failure in reserved recording that nothing is recorded.

Further, though not described hereinabove, when it is discriminated that program starting times of programs included in program table data do not include a program starting time which coincides with a program starting time obtained by decoding of a VCR+code, the video tape recorder may operate otherwise in the following manner. In particular, it is first discriminated whether or not information related to the program labels (program starting times before changed) of the programs included in the program table data (the information includes, when a broadcasting time of a program is changed, a program starting time after changed) coincides with the program starting time obtained by decoding of the VCR+code. Then, a result of the discrimination is displayed on the monitor television 11 so that reservation registration may be performed with the program starting time (program starting time before changed) to which the coincident information (program starting time after changed) belongs. The reservation registration in this instance may be performed based on selection of a user or may be performed automatically. In this instance, the program starting time (program starting time before changed), a program ending time obtained by correction of the program ending time obtained by decoding of the VCR+code with a difference between the program starting time obtained by decoding of the VCR+code and the program starting time (program starting time before changed) mentioned above, and data of channel information obtained by decoding of the VCR+code, are written into the reservation memory 9.

Further, while, in the embodiment described above, a program starting time is used as a program label, any other data which can specify a program may be employed as the program label.

Further, while, in the embodiment described above, a VCR+code is inputted, upon reservation registration, by manual operations of the keys of the remote commander 7 or the key inputting circuit 8 to indirectly input a program starting time, a program ending time and channel information, the broadcasting signal receiver operates similarly also when the program starting time, the program ending time and the channel information are inputted directly by manual operations of the keys of the remote commander 7 or the key inputting circuit 8.

Further, while, in the embodiment described above, program table data or program label data present in a character broadcasting signal multiplexed in a television broadcasting signal are utilized, any other information multiplexed in a television broadcasting signal (information in which program table data, program label data or data equivalent to them is present) may be utilized. In this instance, the character broadcasting decoder 5 in the embodiment of FIG. 1 is replaced with a decoder for different information. For example, such different information in which a program label is present may be information of the VPS (Video Programming System) in European countries including, for example, Germany, information of the EDS (Extended Data Services) in the United States, or the like.

Further, while, in the embodiment described above, the present invention is applied to a video tape recorder, the present invention can naturally be applied similarly to a broadcasting signal receiver for receiving a broadcasting signal in the form of an audio signal.

Having now fully described the invention, it will be apparent to one of ordinary skill in the art that many changes and modifications can be made thereto without departing from the spirit and scope of the invention as set forth herein.

What is claimed is:

1. A broadcasting signal receiver for discriminating a starting time of a respective program reserved by a user for recording by a VCR from among a plurality of programs broadcast as television broadcast signals, said television broadcast signals including program labels indicating starting times for said programs and program table data listing said program labels with updated starting times, comprising:

data inputting means for inputting and decoding into a respective program label a VCR+code of said respective program;

data extracting means for extracting said program table data from said television broadcast signals when said data inputting means decodes said VCR+code into said respective program label, wherein an updated starting time of said respective program is listed in said program table data;

coincidence discriminating means for discriminating whether said starting time of said respective program label is different from the respective program updated starting time listed in said program table data; and outputting means for outputting to said VCR said updated starting time as said starting time of said respective program when said coincidence discriminating means discriminates a difference.

2. The broadcasting signal receiver of claim 1 further comprising user confirmation means for confirming said updated starting time as said starting time of said respective program.

3. The broadcasting signal receiver of claim 1 further comprising audio signaling means for audibly signalling said user when said coincidence discriminating means discriminates a difference.

4. The broadcasting signal receiver of claim 1 wherein said coincidence discriminating means further discriminates whether a program type of said respective program label coincides with a program type of said program labels listed in said program table data.

5. A broadcasting signal receiver for discriminating a starting time of a respective program reserved by a user for recording by a VCR from among a plurality of programs broadcast as television broadcast signals, said television broadcast signals including program labels indicating starting times for said programs and program table data listing said program labels with updated starting times, comprising:

data inputting means for inputting and decoding into a respective program label a VCR+code of said respective program;

data extracting means for extracting said program table data from said television broadcast signals when said data inputting means decodes said VCR+code into said respective program label, wherein an updated starting time of said respective program is listed in said program table data;

coincidence discriminating means for discriminating whether said starting time of said respective program label is different from the respective program updated starting time listed in said program table data and, when a difference is discriminated, further discriminating whether said updated starting time and said starting time of said respective program are similar on the basis of a difference between said starting times; and outputting means for outputting to said VCR said updated starting time as said starting time of said respective program when said coincidence discriminating means discriminates a similarity.

6. The broadcasting signal receiver of claim 5 further comprising user confirmation means for confirming said updated starting time as said starting time of said respective program.

7. The broadcasting signal receiver of claim 5 further comprising audio signaling means for audibly signalling said user when said coincidence discriminating means discriminates a similarity.

8. The broadcasting signal receiver of claim 6 wherein said coincidence discriminating means further discriminates whether a program type of said respective program label coincides with a program type of said program labels listed in said program table data.

* * * * *